(12) United States Patent
Bambila et al.

(10) Patent No.: US 12,474,395 B2
(45) Date of Patent: Nov. 18, 2025

(54) POSITIVE TEMPERATURE COEFFICIENT (PTC) HEATER HEALTH MONITORING SYSTEM

(71) Applicant: Goodrich Corporation, Charlotte, NC (US)

(72) Inventors: Gururaja Bambila, Karnataka (IN); Srinivas Magaji Gundu, Karnataka (IN); Rhushikesh Patil, Bangalore (IN); Manjunath Hiremath, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 276 days.

(21) Appl. No.: 18/305,981

(22) Filed: Apr. 24, 2023

(65) Prior Publication Data

US 2024/0264220 A1 Aug. 8, 2024

(30) Foreign Application Priority Data

Feb. 7, 2023 (IN) .............................. 202311007743

(51) Int. Cl.
*G01R 31/28* (2006.01)
*H05B 3/02* (2006.01)

(52) U.S. Cl.
CPC .......... *G01R 31/2836* (2013.01); *H05B 3/02* (2013.01); *H05B 2203/002* (2013.01); *H05B 2203/02* (2013.01)

(58) Field of Classification Search
CPC ...... G01R 31/2836; G01R 27/02; H05B 3/02; H05B 2203/002; H05B 2203/02; H05B 1/0244

(Continued)

(56) References Cited

U.S. PATENT DOCUMENTS

| | | | | |
|---|---|---|---|---|
| 3,417,330 A | * | 12/1968 | Murphy, Jr. | G01K 7/206 324/714 |
| 3,694,741 A | * | 9/1972 | Abbe | G01R 27/02 324/123 R |

(Continued)

FOREIGN PATENT DOCUMENTS

| | | |
|---|---|---|
| CN | 111284303 B | 2/2021 |
| CN | 113556832 A | 10/2021 |

(Continued)

OTHER PUBLICATIONS

Search Report issued in European Patent Application No. 24156365.9; Application Filing Date Feb. 7, 2024; date of Mailing Jul. 16, 2024 (20 pages).

*Primary Examiner* — Giovanni Astacio-Oquendo
(74) *Attorney, Agent, or Firm* — CANTOR COLBURN LLP

(57) ABSTRACT

A positive temperature coefficient (PTC) heater apparatus is provided and includes a PTC heater and a health monitoring unit. The PTC heater includes resistive elements arranged in balanced groups of a bridge formation. Each of the balanced groups is arranged in a corresponding one of the arms of the bridge formation. The health monitoring unit is electrically connected to the resistive elements. The health monitoring unit is configured to determine a fault condition of the PTC heater based on a fractional change of resistance of the bridge formation caused by a failure of any one or more of the resistive elements in any of the balanced groups of the arms of the bridge formation.

20 Claims, 7 Drawing Sheets

(58) Field of Classification Search
USPC .................................... 324/525, 512, 500
See application file for complete search history.

(56) References Cited

U.S. PATENT DOCUMENTS

| | | | |
|---|---|---|---|
| 5,075,537 | A | 12/1991 | Lorenzen et al. |
| 7,104,462 | B2 | 9/2006 | Shearer |
| 9,587,604 | B2 * | 3/2017 | Kabasin .................. F02M 53/06 |
| 10,184,689 | B2 | 1/2019 | Faulkner |
| 10,726,879 | B2 | 7/2020 | Berman et al. |
| 11,566,949 | B2 * | 1/2023 | Zoppas .................... G01K 7/24 |
| 2007/0257024 | A1 * | 11/2007 | Deangelis .............. H05B 3/342 |
| | | | 219/494 |
| 2008/0197856 | A1 | 8/2008 | Schnaibel et al. |
| 2019/0104568 | A1 * | 4/2019 | Krueger ............... H05B 1/0236 |
| 2021/0270471 | A1 | 9/2021 | Hayden et al. |
| 2022/0365115 | A1 | 11/2022 | Valdes Chavez et al. |

FOREIGN PATENT DOCUMENTS

| | | |
|---|---|---|
| EP | 0445905 A1 | 9/1991 |
| WO | 2021195304 A1 | 9/2021 |

* cited by examiner

POSITIVE TEMPERATURE COEFFICIENT (PTC) HEATER HEALTH MONITORING SYSTEM

CROSS-REFERENCE TO RELATED APPLICATIONS

This application claims the benefit of Indian Application Serial No. 202311007743 filed Feb. 7, 2023, the disclosure of which is incorporated herein by reference in its entirety.

BACKGROUND

The present disclosure relates to positive temperature coefficient (PTC) heaters and, in particular, to a health monitoring system for a PTC heater.

In aerospace technologies, there is often a requirement to adopt, in a water and waste system of an aircraft for example, a simplified freeze protection heater that can be self-regulated and that has a lightweight and thin construction. A PTC element-based heater has an inherent property of self-regulated heating operation, overheat protection and overload protection. However, with PTC heaters, health monitoring is needed using an external device as mandated.

SUMMARY

According to an aspect of the disclosure, a positive temperature coefficient (PTC) heater apparatus is provided and includes a PTC heater and a health monitoring unit. The PTC heater includes resistive elements arranged in balanced groups of a bridge formation. Each of the balanced groups is arranged in a corresponding one of the arms of the bridge formation. The health monitoring unit is electrically connected to the resistive elements. The health monitoring unit is configured to determine a fault condition of the PTC heater based on a fractional change of resistance of the bridge formation caused by a failure of any one or more of the resistive elements in any of the balanced groups of the arms of the bridge formation.

In accordance with additional or alternative embodiments, the health monitoring unit is configured to determine the fault condition based on the fractional change of resistance of the bridge formation caused by at least one of a failure of one or more of the resistive elements in a balanced group arranged in one of the arms of the bridge formation and a failure of one or more of the resistive elements in balanced groups arranged in more than one of the arms of the bridge formation.

In accordance with additional or alternative embodiments, the health monitoring unit establishes a threshold for a fault determination in accordance with resistive element noise and amplifier noise.

In accordance with additional or alternative embodiments, power to the PTC heater is cut off in an event of a fault condition determination by the health monitoring unit.

In accordance with additional or alternative embodiments, the PTC heater includes dielectric layers, a first conducting trace including a first conducting trace portion interposed between the dielectric layers, a first sensing line interposed between the dielectric layers, a second conducting trace comprising a second conducting trace portion interposed between the dielectric layers, a second sensing line interposed between the dielectric layers and PTC heating patches and each PTC heating patch is electrically connected between the first conducting trace portion and the first sensing line and interposed between the dielectric layers or between the second conducting trace portion and the second sensing line and interposed between the dielectric layers.

In accordance with additional or alternative embodiments, the PTC heating patches are provided as the resistive elements in the balanced groups of the bridge formation and the PTC heating patches are arranged in linear rows and each linear row corresponds to one of the balanced groups arranged in the corresponding one of the arms of the bridge formation.

In accordance with additional or alternative embodiments, a resistance temperature detector (RTD) sensor is mounted to an exterior face of one of the dielectric layers and the health monitoring unit is electrically connected to the RTD sensor to receive readings of the RTD sensor, which, when the PTC heater is powered on, indicate whether the PTC heater is faulty.

In accordance with additional or alternative embodiments, an insulating layer is disposed about the RTD sensor at the exterior face of the one of the dielectric layers.

According to an aspect of the disclosure, a positive temperature coefficient (PTC) heater apparatus is provided and includes a PTC heater, a resistance temperature detector (RTD) sensor and a health monitoring unit. The PTC heater includes resistive elements arranged in balanced groups of a bridge formation and each of the balanced groups is arranged in a corresponding one of the arms of the bridge formation. The RTD sensor is mounted to the PTC heater. The health monitoring unit is electrically connected to the resistive elements and to the RTD sensor. The health monitoring unit is configured to determine a fault condition of the PTC heater based on a fractional change of resistance of the bridge formation caused by a failure of any one or more of the resistive elements in any of the balanced groups of the arms of the bridge formation and is electrically connected to the RTD sensor to receive readings of the RTD sensor, which, when the PTC heater is powered on, indicate whether the PTC heater is faulty.

In accordance with additional or alternative embodiments, the health monitoring unit is configured to determine the fault condition based on the fractional change of resistance of the bridge formation caused by at least one of a failure of one or more of the resistive elements in a balanced group arranged in one of the arms of the bridge formation and a failure of one or more of the resistive elements in balanced groups arranged in more than one of the arms of the bridge formation.

In accordance with additional or alternative embodiments, the health monitoring unit establishes a threshold for a fault determination in accordance with resistive element noise and amplifier noise.

In accordance with additional or alternative embodiments, power to the PTC heater is cut off in an event of a fault condition determination by the health monitoring unit.

In accordance with additional or alternative embodiments, the PTC heater includes dielectric layers, a first conducting trace comprising a first conducting trace portion interposed between the dielectric layers, a first sensing line interposed between the dielectric layers, a second conducting trace comprising a second conducting trace portion interposed between the dielectric layers, a second sensing line interposed between the dielectric layers and PTC heating patches. Each PTC heating patch is electrically connected between the first conducting trace portion and the first sensing line and interposed between the dielectric layers or between the second conducting trace portion and the second sensing line and interposed between the dielectric layers.

In accordance with additional or alternative embodiments, the PTC heating patches are provided as the resistive elements in the balanced groups of the bridge formation and the PTC heating patches are arranged in linear rows, each linear row corresponding to one of the balanced groups arranged in the corresponding one of the arms of the bridge formation.

In accordance with additional or alternative embodiments, the RTD sensor is mounted to an exterior face of one of the dielectric layers.

In accordance with additional or alternative embodiments, an insulating layer is disposed about the RTD sensor at the exterior face of the one of the dielectric layers.

According to an aspect of the disclosure, a method of operating a positive temperature coefficient (PTC) heater apparatus in which resistive elements of a PTC heater are arranged in balanced groups of a bridge formation, each of the balanced groups being arranged in a corresponding one of the arms of the bridge formation, is provided. The method includes monitoring a resistance of the bridge formation, observing whether the bridge formation has a fractional change of resistance, determining whether the fractional change of resistance is indicative of a fault condition and cutting off power to the PTC heater in an event the fractional change of resistance is indicative of the fault condition.

In accordance with additional or alternative embodiments, the fractional change of resistance is caused by at least one of a failure of one or more of the resistive elements in a balanced group arranged in one of the arms of the bridge formation and a failure of one or more of the resistive elements in balanced groups arranged in more than one of the arms of the bridge formation.

In accordance with additional or alternative embodiments, the determining of whether the fractional change of resistance is indicative of the fault condition includes establishing a threshold for a fault determination in accordance with resistive element noise and amplifier noise.

In accordance with additional or alternative embodiments, the method further includes sensing a temperature of the PTC heater and cutting of the power to the PTC heater in accordance with a result of the sensing.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, a health monitoring system for a PTC heater is provided. The health monitoring system carries out monitoring of heater element failure incidents of the PTC heater and provides a status indicator as an input to a master system. In particular, the health monitoring system detects PTC resistive element faults by a construction of a Wheatstone Full Bridge form. The PTC resistive elements are divided into four effective groups, which correlate to the four arms of the Wheatstone Full Bridge. Resistance as a function of fractional change is considered to detect failure of heater elements. During normal conditions, all of the PTC resistive elements of the PTC heater behave the same and hence the relative fractional change is null. If a few of the PTC resistive elements fail, this results in an increase of resistance in the relevant arm of the Wheatstone Full Bridge and in turn resulting in increased fractional change of resistance that will trigger a fault status indicator. The Wheatstone Full Bridge is characterized as having a low linearity error with a bridge tolerance that is a same as a resistive element tolerance. A threshold for fault measurement is set considering intrinsic noise, such as resistive element thermal noise and amplifier noise. The Wheatstone Full Bridge provides an advantage of temperature drift and stability (time drift) as bridge elements are balanced and the operation of the bridge is as a device that reads a difference directly as voltage. The health monitoring system therefore provides for a safety feature in which a temperature status is considered for controlling power to the PTC heater. In case of PTC temperature crossing a set threshold, a fault condition is signaled and power to the PTC heater is disconnected. A resistance temperature detector (RTD) sensor can be provided as a quarter bridge and will monitor the PTC heater temperature. Through a window comparator, a fault status will be reported if the temperature is beyond a threshold limit.

Figure 1:
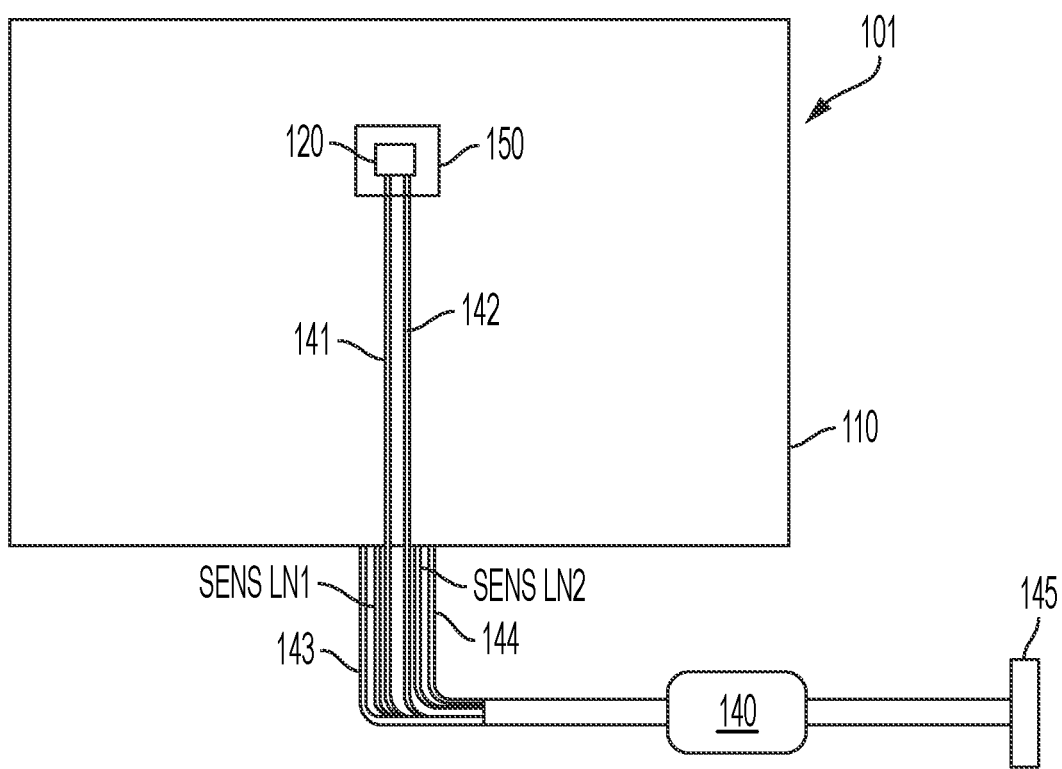
FIG. 1 is a top-down view of a PTC heater apparatus in accordance with embodiments.

With reference to FIG. 1, a PTC heater apparatus 101 is provided and includes a PTC heater 110, an RTD sensor 120 that is mounted to the PTC heater 110 and a health monitoring unit 140. The health monitoring unit 140 is electrically connected to at least the RTD sensor 120 and is configured to receive readings of the RTD sensor 120. The readings of the RTD sensor 120 can indicate whether the PTC heater 110 is faulty when the PTC heater 110 is powered on. A connector 145 can be connected to the health monitoring unit 140 so that the health monitoring unit 140 can be communicative with an external device (i.e., an external computing device and display).

Figure 2:
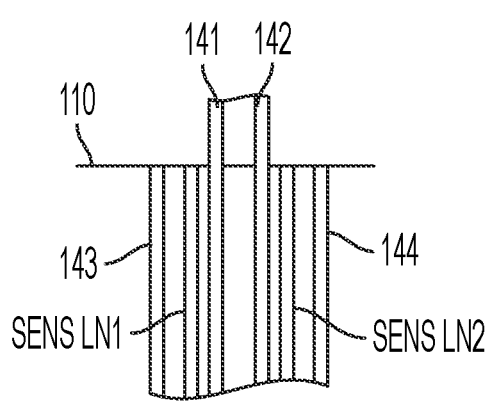
FIG. 2 is an enlarged view of the portion of FIG. 1 surrounded by dashed box 1 in accordance with embodiments.

With continued reference to FIG. 1 and with additional reference to FIG. 2, an RTD bridge formation 502 (see FIG. 5) of the health monitoring unit 140 is electrically connected to the RTD sensor 120 by way of first and second conductive lines 141 and 142. In addition, the health monitoring unit 140 can be connected to the PTC heater 110 by a first "line"

conductor 143 and by a second "return" conductor 144 as well as by a first sensing line SENS LN1 and a second sensing line SENS LN2 lines.

Figure 3:
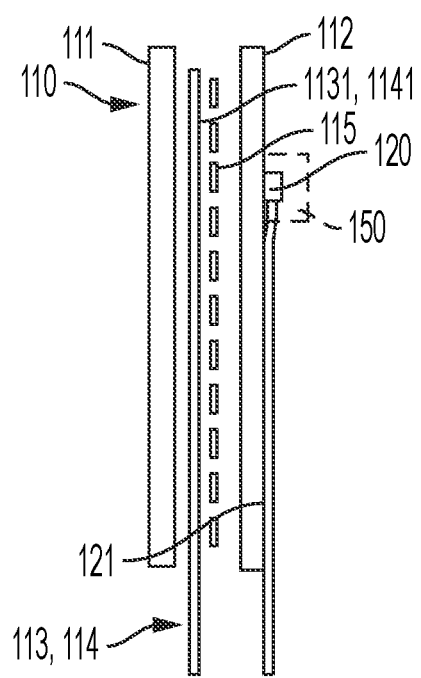
FIG. 3 is a side view of the PTC heater apparatus of FIG. 1 in accordance with embodiments.
Figure 4:
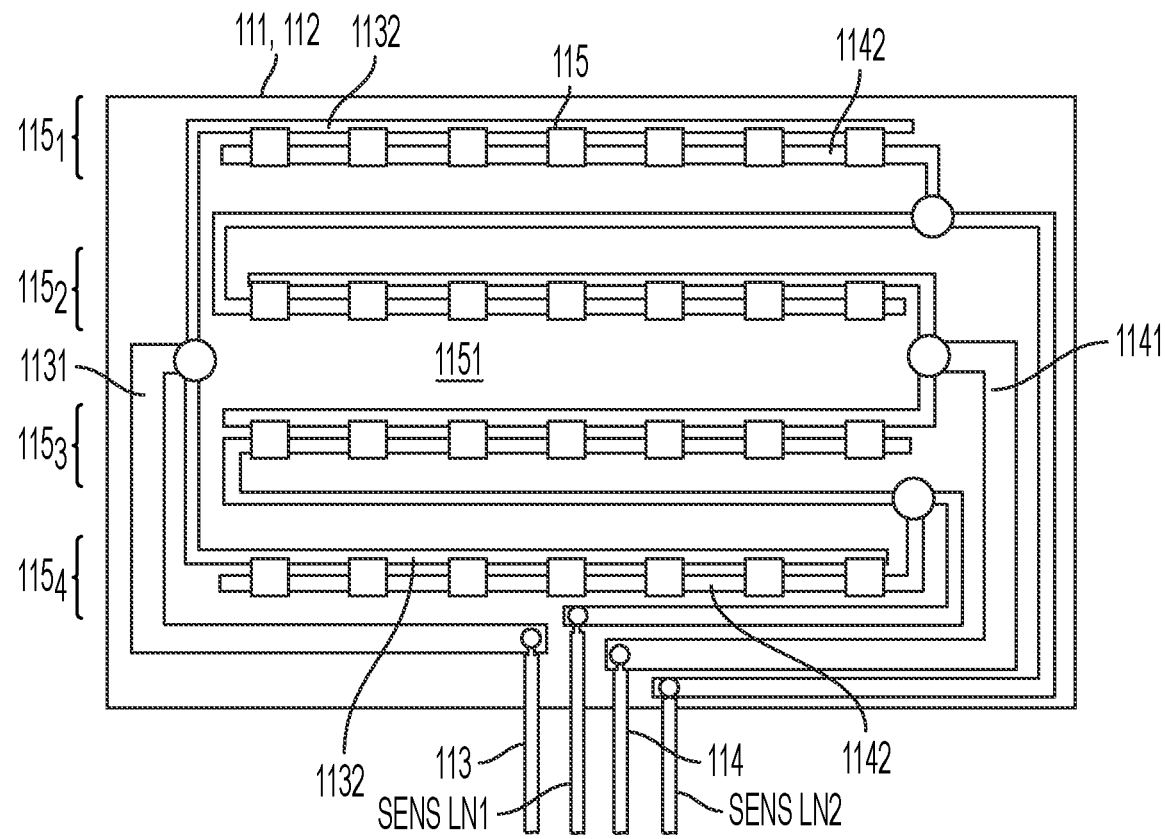
FIG. 4 is a top-down view of components of a PTC heater of the PTC heater apparatus of FIG. 1 in accordance with embodiments.

With continued reference to FIG. 1 and with additional reference to FIGS. 3 and 4, the PTC heater 110 includes first and second dielectric layers 111 and 112, which can be provided as thermoplastic, a first conducting trace 113, the first sensing line SENS LN1, a second conducting trace 114, the second sensing line SENS LN2 and PTC heating patches 115. The first conducting trace 113 includes a first conducting extension 1131, which is interposed between the first and second dielectric layers 111 and 112, and the second conducting trace 114 includes a second conducting extension 1141, which is interposed between the first and second dielectric layers 111 and 112. The first conducting extension 1131 extends from the first conducting trace 113 to an intersection of two arms of a bridge (i.e., the left arms of the full bridge formation of FIG. 5). The second conducting extension 1141 extends from the second conducting trace 114 to an intersection of two arms of a bridge (i.e., the right arms of the full bridge formation of FIG. 5). SENS LN1 and SENS LN2 can be connected to the other two nodes (i.e., the other two nodes of the full bridge formation of FIG. 5). The PTC heating patches 115 are each electrically connected between the first and second conducting traces 1131 and 1141 and the first and second sensing lines SENS LN1 and SENS LN2 and are each interposed between the first and second dielectric layers 111 and 112. Each of the PTC heating patches 115 can be formed of an electrical resistance heater material whose resistance increases significantly with temperature.

Figure 5:
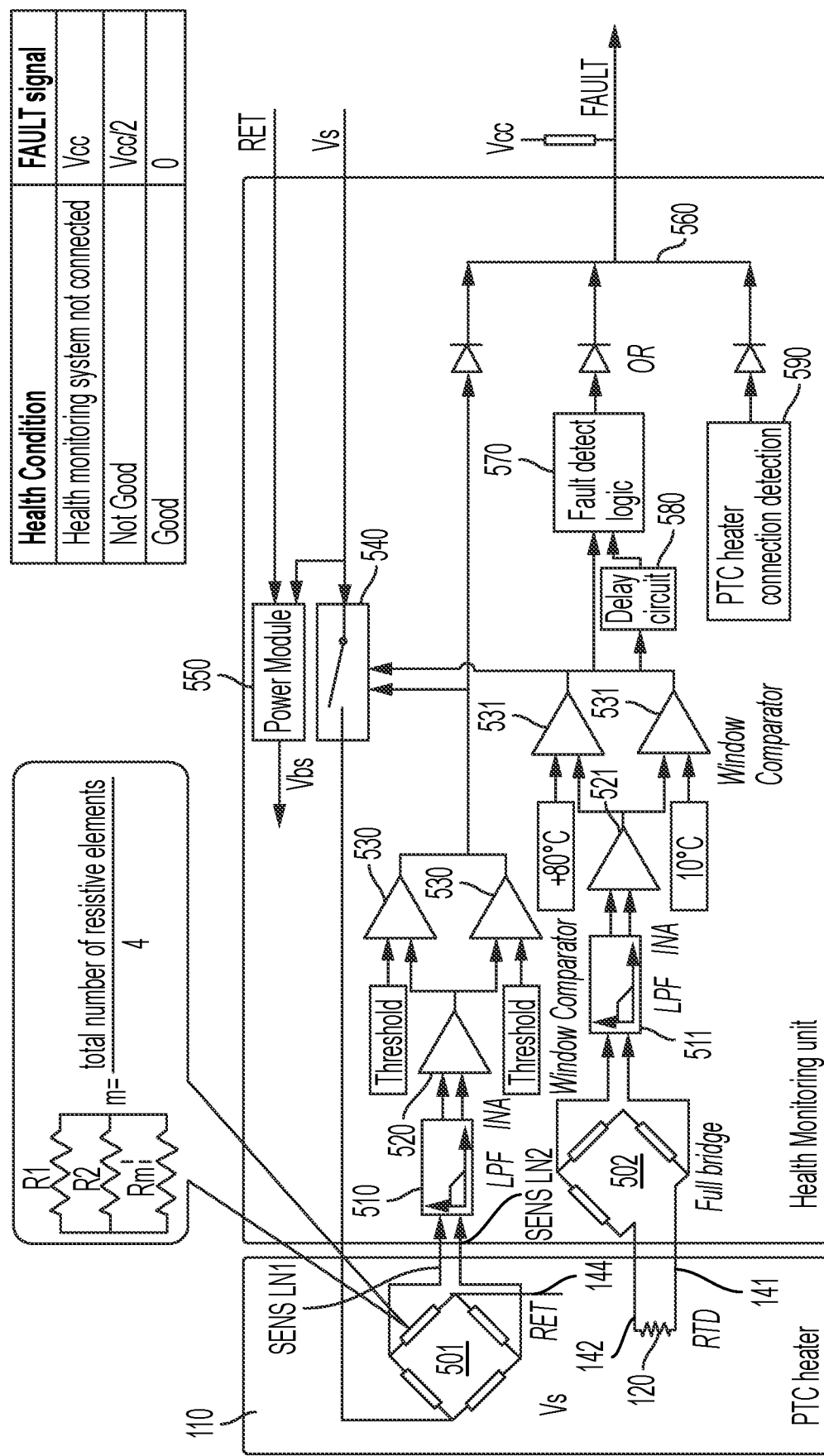
FIG. 5 is a schematic circuit diagram of a health monitoring system for the PTC heater apparatus of FIG. 1 in accordance with embodiments.

The PTC heating patches 115 are provided as resistance elements and are arranged in groups that correspond to arms of a Wheatstone Bridge formation in the health monitoring unit 140 (i.e., a bridge formation or the full bridge formation 501 of FIG. 5). In greater detail, a first group of the PTC heating patches 1151 is arranged in a linear row and electrically connected between the first conducting trace and bridge arm portion 1131 and the first sensing line SENS LN1, a second group of the PTC heating patches 1152 is arranged in a linear row and electrically connected between the second conducting trace and bridge arm portion 1141 and the first sensing line SENS LN1, a third group of the PTC heating patches 1153 is arranged in a linear row and electrically connected between the second conducting trace and bridge arm portion 1141 and the second sensing line SENS LN2 and a fourth group of the PTC heating patches 1154 is arranged in a linear row and electrically connected between the first conducting trace and bridge arm portion 1131 and the second sensing line SENS LN2. In this way, each of the first-fourth group of the PTC heating patches 1151-4 is balanced.

As shown in FIG. 3, the RTD sensor 120 can be mounted to an exterior face 121 of one of the first and second dielectric layers 111 and 112. Also, the PTC heater apparatus 101 can additionally include an insulating layer 150. The insulating layer 150 is disposed about the RTD sensor 120 at the exterior face 121.

As shown in FIG. 4, the first and second conducting trace and bridge arm portions 1131 and 1141 can be patterned along peripheral sides and central portions of the first and second dielectric layers 111 and 112 and can include first and second crossing traces 1132 and 1142 that extend across the first and second dielectric layers 111 and 112 in an interleaved formation with the first sensing line SENS LN1 and the second sensing line SENS LN2. Each of the PTC heating patches 115 can be arranged in a lattice formation 1151 that forms the above-noted linear rows to electrically connect between proximal portions of the first and second crossing traces 1132 and 1142 and the SENS LN1 and the SENS LN2 as shown. With this configuration, voltage applied to the PTC heater 110 results in a generally uniform heating pattern in the absence of a fault in the PTC heater 110.

It is to be understood that, while FIG. 4 illustrates linear rows of heating patches 115, this is not required and that other formations and arrangements of heating patches 115 are possible.

In addition, as shown in FIG. 5, the health monitoring unit 140 is communicative with the full bridge formation 501 of the PTC heater 110, which includes the resistive elements as described above, and includes RTD bridge formation 502 that is communicative with the RTD sensor 120 via first and second conductive lines 141 and 142. The RTD sensor 120 is thus one segment of the RTD bridge formation 502 and the remaining three segments are resistor mounted within circuitry packaging (external to heater) with equal resistance value to the RTD sensor 120. The health monitoring unit 140 includes a signal conditioning unit 510, an instrumentation amplifier unit 520 and a window comparator unit 530 for the full bridge formation 501 as well as a signal conditioning unit 511, an instrumentation amplifier unit 521 and a window comparator unit 531 for RTD bridge formation 502. The health monitoring unit 140 further includes a safety switch 540, a power module 550 and a fault detection logic unit 560. In addition, the health monitoring unit 140 includes a logic unit 570 interposed between the window comparator unit 531 and the fault detection logic unit 560, a delay circuit 580 interposed between the window comparator unit 531 and the logic circuit 570 and a connector detection unit 590.

During an operation of the health monitoring unit 140 during which each of the PTC heating patches 115 are operating correctly, the signal conditioning unit 510, the instrumentation amplifier unit 520 and the window comparator unit 530 generate an output that the fault detection logic unit 560 reads as a null fractional change in the resistivity of the full bridge formation 501 and a no-fault condition. However, in an event that one of the PTC heater patches 115 corresponding to one of the arms of the full bridge formation 501 or in an event that multiple PTC heater patches 115 corresponding to multiple arms of the full bridge formation 501 fail, the signal conditioning unit 510, the instrumentation amplifier unit 520 and the window comparator unit 530 generate an output that the fault detection logic unit 560 reads as a fractional change in the resistivity of the full bridge formation 501. This fractional change can then be interpreted along with an output of the connector detection unit 590 as a fault condition if it exceeds thresholds set in the window comparator unit 530. The thresholds are established by considering intrinsic noise, such as resistive element thermal noise and amplifier noise as well as acceptable levels of PTC element damages.

During a parallel operation of the health monitoring unit 140, readings of the RTD sensor 120 can be received via the RTD bridge formation 502. Resistance changes in RTD sensor 120 segments due to PTC heater 110 temperature changes results in an imbalance in the RTD bridge formation 502. The readings are then passed to the signal conditioning unit 511, the instrumentation amplifier unit 521 and the window comparator unit 531, which generate an output that is read by the fault detection logic unit 560 via the delay circuit 580 and the logic unit 570. This output is then interpreted as a no-fault or fault condition of they are outside thresholds for RTD sensor readings set by the window comparator unit 531.

In an event the fault detection logic unit 560 determines that a fault condition is in effect for the PTC heater 110, power to the PTC heater 110 can be cut off by the safety switch 540.

Figure 6:
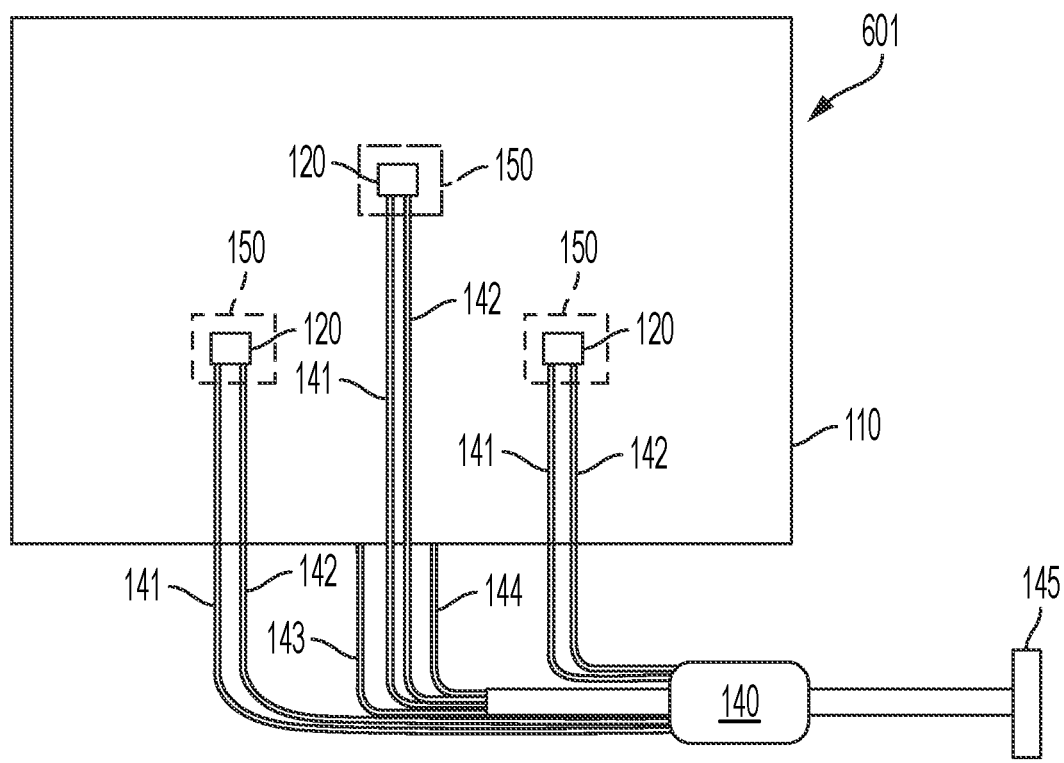
FIG. 6 is a top-down view of a PTC heater apparatus in accordance with embodiments.

With reference to FIG. 6, a PTC heater apparatus 601 is provided and includes similar features as the PTC heater apparatus 101 of FIG. 1 except that multiple resistance temperature detector (RTD) sensors 120 are mounted to the PTC heater 110 and the health monitoring unit 140 is electrically connected to each of the multiple RTD sensors 120 to receive readings of each of the multiple RTD sensors 120. Though not specifically shown in FIG. 6, in the PTC heater apparatus 601 of FIG. 6, the health monitoring unit 140 is modified to include circuitry for each of the multiple RTD sensors 120.

Figure 7:
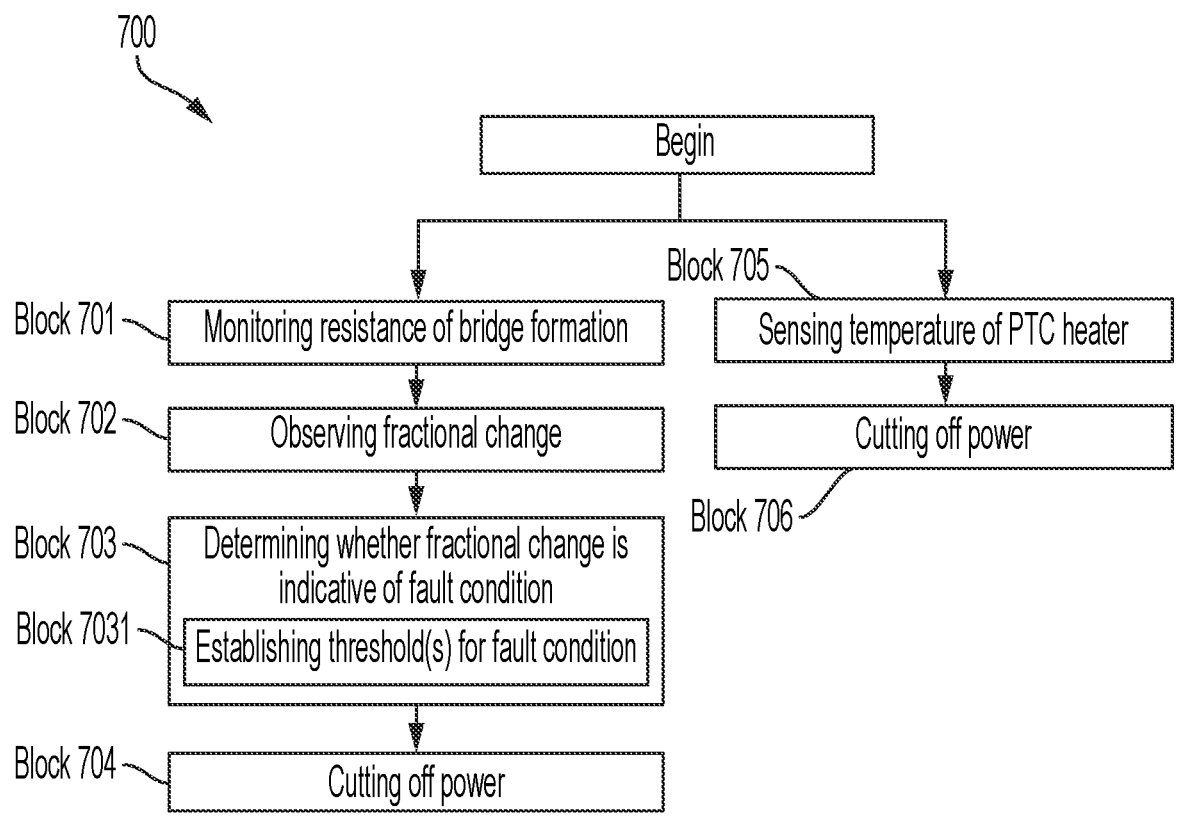
FIG. 7 is a flow diagram illustrating a method of operating a PTC heater apparatus in accordance with embodiments.

With reference to FIG. 7, a method 700 of operating a PTC heater apparatus is provided in which resistive elements of a PTC heater are arranged in balanced groups of a bridge formation, each of the balanced groups being arranged in a corresponding one of the arms of the bridge formation. The method 700 includes monitoring a resistance of the bridge formation (block 701), observing whether the bridge formation has a fractional change of resistance (block 702), determining whether the fractional change of resistance is indicative of a fault condition (block 703) and cutting off power to the PTC heater in an event the fractional change of resistance is indicative of the fault condition (block 704).

In accordance with embodiments, the fractional change of resistance is caused by at least one of a failure of one or more of the resistive elements in a balanced group arranged in one of the arms of the bridge formation and a failure of one or more of the resistive elements in balanced groups arranged in more than one of the arms of the bridge formation. The fractional change of resistance can also indicate failure if there is no power source to bridge or if any of the input lines to the PTC heater are cut. Also, the determining of whether the fractional change of resistance is indicative of the fault condition of block 703 can include establishing a threshold for a fault determination in accordance with resistive element noise and amplifier noise (block 7031). In addition, the method 700 can also include sensing a temperature of the PTC heater (block 705) and cutting of the power to the PTC heater in accordance with a result of the sensing (block 706). It is to be understood that PTC elements have a temperature response time, which is different from the RTD response time. Hence, reading comparator outputs could give false readings. The above-described delay circuit (i.e., the delay circuit 580 of FIG. 5) addresses this by providing for timing of relative response times. The delay thus generated by the delay circuit 580 is provided in consideration of the ramp up time of the PTC heater to reach the threshold temperature and to thereby avoid false fault status reporting during this time. The delay can be preset in accordance with experimental results. A comparator output can have two values: one delayed (past data) and one that is non-delayed (present data). These form an input to the fault detection logic unit 570 and an output of the fault detection logic unit 570 provides for a signal status.

Figure 8:
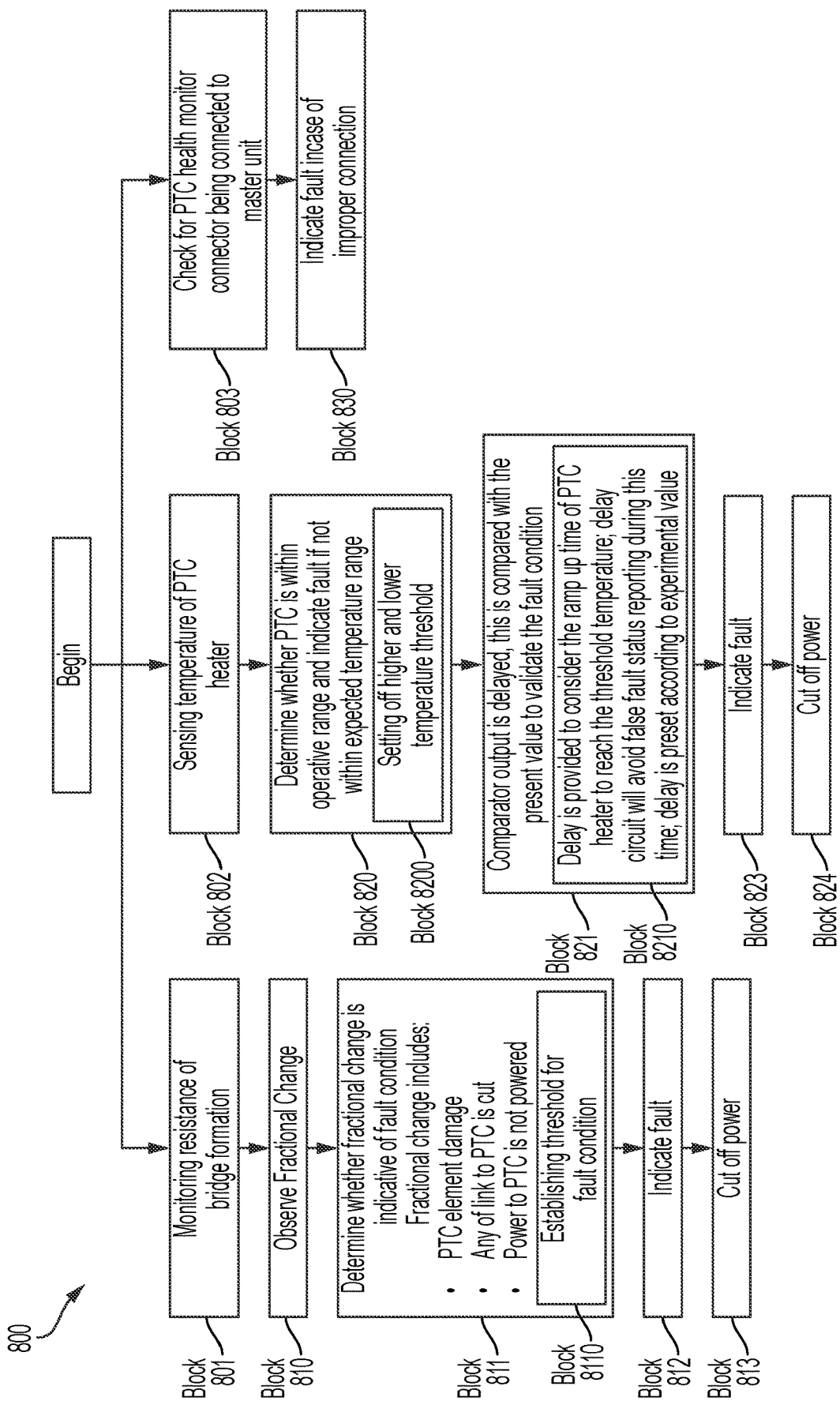
FIG. 8 is a flow diagram illustrating a detailed method of operating a PTC heater apparatus in accordance with embodiments.

With reference to FIG. 8, a method 800 of operating a PTC heater apparatus is provided in which resistive elements of a PTC heater are arranged in balanced groups of a bridge formation, each of the balanced groups being arranged in a corresponding one of the arms of the bridge formation. The method 800 includes parallel operations of monitoring resistance of a bridge formation (block 801), sensing a temperature of a PTC heater (block 802) and checking for a PTC health monitor connector being connected to a master unit (block 803). For the monitoring of the resistance of the bridge formation of block 801, the method 800 further includes observing a fractional change (block 810), determining whether the fractional change is indicative of a fault condition such as PTC element damage, a PTC link being cut or power to the PTC not being available (block 811), which includes establishing a threshold for a fault condition (block 8110), indicating a fault (block 812) and cutting off power (block 813). For the sensing of the temperature of the PTC heater of block 802, the method 800 includes determining whether the PTC is within an operative range and indicate a fault if the PTC is not within the operative range (block 820), which includes a setting of high and low temperature thresholds (block 8200), comparing a delayed comparator output with a present value to validate a fault condition (block 821), which includes presetting a delay (block 8210), indicating a fault (block 823) and cutting off power (block 824). For the checking for the PTC health monitor connector being connected to a master unit of block 803, the method 800 includes indicating a fault in case of an improper connection (block 830).

Technical effects and benefits of the present disclosure are the provision of a health monitoring system for a PTC heater. The health monitoring system has a simple fault reporting functionality and is characterized as having a low component count, low power requirements, a lower volume, high reliability and cost sensitivity. The health monitoring system includes a heating element layer with dual functions (i.e., as a heater and as a sensing element) and does not require the use of a microcontroller.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A positive temperature coefficient (PTC) heater apparatus, comprising:
    a PTC heater comprising resistive elements arranged in balanced groups of a bridge formation, each of the balanced groups being arranged in a corresponding one of the arms of the bridge formation; and
    a health monitoring unit electrically connected to the resistive elements,
    the health monitoring unit being configured to determine a fault condition of the PTC heater based on a fractional change of resistance of the bridge formation caused by a failure of any one or more of the resistive elements in any of the balanced groups of the arms of the bridge formation.

2. The PTC heater apparatus according to claim 1, wherein the health monitoring unit is configured to determine the fault condition based on the fractional change of resistance of the bridge formation caused by at least one of:
a failure of one or more of the resistive elements in a balanced group arranged in one of the arms of the bridge formation, and
a failure of one or more of the resistive elements in balanced groups arranged in more than one of the arms of the bridge formation.

3. The PTC heater apparatus according to claim 1, wherein the health monitoring unit establishes a threshold for a fault determination in accordance with resistive element noise and amplifier noise.

4. The PTC heater apparatus according to claim 1, wherein power to the PTC heater is cut off in an event of a fault condition determination by the health monitoring unit.

5. The PTC heater apparatus according to claim 1, wherein the PTC heater comprises:
dielectric layers;
a first conducting trace comprising a first conducting trace portion interposed between the dielectric layers;
a first sensing line interposed between the dielectric layers;
a second conducting trace comprising a second conducting trace portion interposed between the dielectric layers;
a second sensing line interposed between the dielectric layers; and
PTC heating patches, each being electrically connected between the first conducting trace portion and the first sensing line and interposed between the dielectric layers or between the second conducting trace portion and the second sensing line and interposed between the dielectric layers.

6. The PTC heater apparatus according to claim 5, wherein:
the PTC heating patches are provided as the resistive elements in the balanced groups of the bridge formation, and
the PTC heating patches are arranged in linear rows, each linear row corresponding to one of the balanced groups arranged in the corresponding one of the arms of the bridge formation.

7. The PTC heater apparatus according to claim 5, further comprising a resistance temperature detector (RTD) sensor mounted to an exterior face of one of the dielectric layers,
wherein the health monitoring unit is electrically connected to the RTD sensor to receive readings of the RTD sensor, which, when the PTC heater is powered on, indicate whether the PTC heater is faulty.

8. The PTC heater apparatus according to claim 7, further comprising an insulating layer disposed about the RTD sensor at the exterior face of the one of the dielectric layers.

9. A positive temperature coefficient (PTC) heater apparatus, comprising:
a PTC heater comprising resistive elements arranged in balanced groups of a bridge formation, each of the balanced groups being arranged in a corresponding one of the arms of the bridge formation; and
a resistance temperature detector (RTD) sensor mounted to the PTC heater; and
a health monitoring unit electrically connected to the resistive elements and to the RTD sensor,
the health monitoring unit being configured to determine a fault condition of the PTC heater based on a fractional change of resistance of the bridge formation caused by a failure of any one or more of the resistive elements in any of the balanced groups of the arms of the bridge formation and being electrically connected to the RTD sensor to receive readings of the RTD sensor, which, when the PTC heater is powered on, indicate whether the PTC heater is faulty.

10. The PTC heater apparatus according to claim 9, wherein the health monitoring unit is configured to determine the fault condition based on the fractional change of resistance of the bridge formation caused by at least one of:
a failure of one or more of the resistive elements in a balanced group arranged in one of the arms of the bridge formation, and
a failure of one or more of the resistive elements in balanced groups arranged in more than one of the arms of the bridge formation.

11. The PTC heater apparatus according to claim 9, wherein the health monitoring unit establishes a threshold for a fault determination in accordance with resistive element noise and amplifier noise.

12. The PTC heater apparatus according to claim 9, wherein power to the PTC heater is cut off in an event of a fault condition determination by the health monitoring unit.

13. The PTC heater apparatus according to claim 9, wherein the PTC heater comprises:
dielectric layers;
a first conducting trace comprising a first conducting trace portion interposed between the dielectric layers;
a first sensing line interposed between the dielectric layers;
a second conducting trace comprising a second conducting trace portion interposed between the dielectric layers;
a second sensing line interposed between the dielectric layers; and
PTC heating patches, each being electrically connected between the first conducting trace portion and the first sensing line and interposed between the dielectric layers or between the second conducting trace portion and the second sensing line and interposed between the dielectric layers.

14. The PTC heater apparatus according to claim 9, wherein:
the PTC heating patches are provided as the resistive elements in the balanced groups of the bridge formation, and
the PTC heating patches are arranged in linear rows, each linear row corresponding to one of the balanced groups arranged in the corresponding one of the arms of the bridge formation.

15. The PTC heater apparatus according to claim 9, wherein the RTD sensor is mounted to an exterior face of one of the dielectric layers.

16. The PTC heater apparatus according to claim 15, further comprising an insulating layer disposed about the RTD sensor at the exterior face of the one of the dielectric layers.

17. A method of operating a positive temperature coefficient (PTC) heater apparatus in which resistive elements of a PTC heater are arranged in balanced groups of a bridge formation, each of the balanced groups being arranged in a corresponding one of the arms of the bridge formation, the method comprising:

mounting, to the PTC heater, a resistance temperature detector (RTD) sensor configured to monitor a temperature of the PTC heater;

electrically connecting, to the RTD sensor, a health monitoring unit configured to receive readings of the RTD sensor;

monitoring, by the health monitoring unit, a resistance of the bridge formation;

observing, by the health monitoring unit, whether the bridge formation has a fractional change of resistance;

determining, through a parallel operation of the health monitoring unit, whether the fractional change of resistance is indicative of a fault condition based on the readings of the RTD sensor; and cutting off power to the PTC heater, by a safety switch of the health monitoring unit, in an event the fractional change of resistance is indicative of the fault condition.

18. The method according to claim 17, wherein the fractional change of resistance is caused by at least one of:

a failure of one or more of the resistive elements in a balanced group arranged in one of the arms of the bridge formation, and a failure of one or more of the resistive elements in balanced groups arranged in more than one of the arms of the bridge formation.

19. The method according to claim 17, wherein the determining of whether the fractional change of resistance is indicative of the fault condition comprises establishing a threshold for a fault determination in accordance with resistive element noise and amplifier noise.

20. The method according to claim 17, further comprising:

sensing a temperature of the PTC heater; and cutting of the power to the PTC heater in accordance with a result of the sensing.

* * * * *